Patented Dec. 11, 1923.

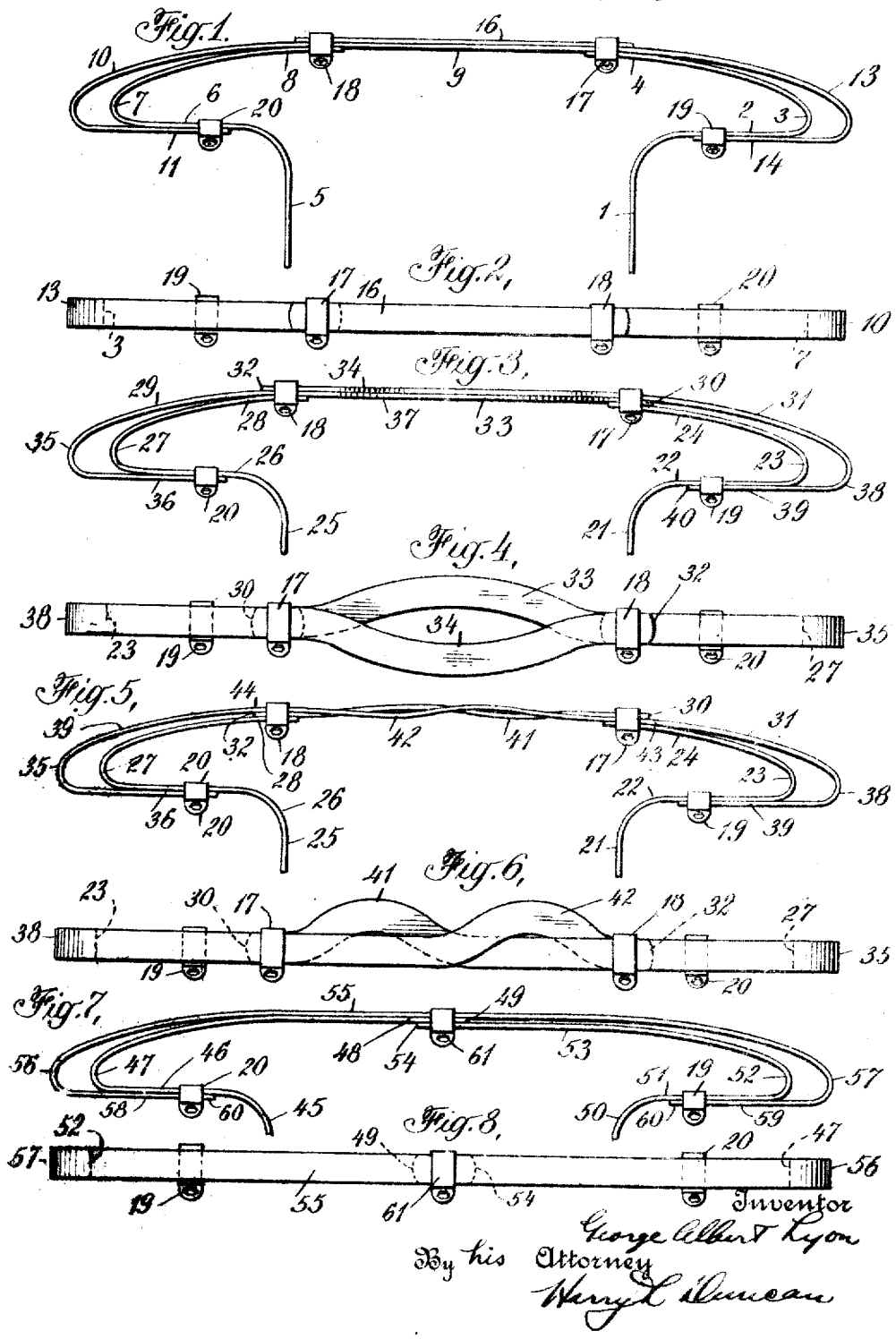

1,476,825

UNITED STATES PATENT OFFICE.

GEORGE ALBERT LYON, OF PHILADELPHIA, PENNSYLVANIA.

AUTOMOBILE BUFFER.

Application filed February 11, Serial No. 444,206. Renewed September 5, 1922. Serial No. 586,355.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile Buffers, of which the following is a specification, taken in connection with the accompanying drawing, which forms part of the same.

This invention relates especially to buffers or bumpers for automobiles or other vehicles, in which the buffer front element which may be formed of one or more pieces or strips of tempered steel or other suitable material adjustably or permanently connected together, may be adjustably clamped or connected to the composite or other attaching element of the buffer which may also be formed of one or more strips or pieces of resilient steel. Where either one of these two cooperating elements is formed of several pieces of steel strip or other material, it may be independently adjusted with respect to the other element of the buffer and clamped thereto in any desired adjusted position which is advantageous to secure the width adjustment of the attaching arms which may be clamped or connected to the vehicle frame, or for adjusting the width or lateral extent of the ends of the buffer front. It is in many cases desirable to have the inner attaching element of the buffer formed with integral or other loop portions so that connection may be made at both the front and rear connector portions of the buffer front element where this is provided with looped ends. Although it is not of course necessary in all cases, it is sometimes desirable to form the buffer front element with vertical extending or upwardly arched or bent contact portions; and where the buffer front element is formed of several pieces or strips of resilient metal, they may of course be either adjustably clamped or connected together or permanently rigidly welded or otherwise connected as desired.

In the accompanying drawing showing in a somewhat diagrammatic way various illustrative embodiments of the invention.

Fig. 1 is a plan view of an illustrative buffer; and

Fig. 2 is a corresponding front view.

Fig. 3 is a plan view of another embodiment; and

Fig. 4 is a front view thereof.

Fig. 5 is a plan view of still another buffer; and

Fig. 6 is a corresponding front view.

Fig. 7 is a plan view of still another illustrative embodiment; and

Fig. 8 is a front view thereof.

These buffer elements which are preferably though not necessarily made of tempered steel strip which may be about two or three inches wide and one-quarter to three-eighths of an inch thick more or less may comprise a composite or one piece buffer front element adjustably connected to a composite inner or attaching element. The buffer front element may be formed of a spring steel strip having the end outer loops 10, 13 connected by the front strip 9, which is preferably substantially straight throughout a considerable part of its length, so as to form a front connector portion; while the end loops are formed with inturned extensions or rear connector portions 11, 14, which are preferably substantially parallel with said front connector portion. The inner or attaching element of the buffer may be formed of several pieces of spring steel strip, which may each comprise an attaching arm such as 1, to which may be connected through a bent portion the rear connector portion 2 adapted to cooperate with the connector portion 14 of the front element. An inner end loop 3 may be formed on this attaching strip and it may if desired be continued inward and forward to form a front connector portion 4, preferably parallel to the rear connector portion 2 of the strip and adapted to cooperate with and be clamped or connected to the front connector portion of the buffer front element. By clamping or connecting these two cooperating resilient strips at two such separated points as by the encircling clamping devices 17, 19, a very desirable and strong connection is secured and a high degree of mutual reenforcing action is secured between these two looped end members. The other attaching arm 5 may have an outwardly extending portion 6 and end loop 7 arranged inside the end loop 10 of the buffer front member while the inward and forward extension of this attaching strip may constitute a front connector portion 8, adapted to be clamped as by the clamping device 18 to the connector portion of the buffer front element while the rear clamping device 20 connects these two strips at another aligned portion thereof. If desired also one or more additional front reenforcing strips such as 16 may be connected to the buffer front connector portion as by passing through the front connecting or clamping devices 17, 18. With this arrangement which has a neat and desirable appearance from the front as is seen in Fig. 2, the looped end attaching strips may be adjusted independently with respect to the buffer front element, so as to adjust the distance of the attaching arms apart or to adjust the distance apart of the outer end loops as may be necessary or desired.

In Fig. 3 the buffer front element is composite and is made up of several strips of resilient steel or other material, one of these front strips 37 having the rear connector portion 36 and end loop 35 from which the strip may extend forward and inward from the curve 29 to the point 30 on the other side of the buffer. If desired as shown in Fig. 4, this front portion 33 may be upwardly arched or bent to form an upwardly extending contact portion while if desired, the corresponding front portion 34 of the other buffer front strip may extend either upward or downward to form a corresponding contact portion. The cooperating connector portions 30, 32 of these strips are however, preferably aligned so that they may be conveniently and effectively clamped or connected as by the clamping devices 17, 18, which may allow a considerable relative adjustment between these parts if desired. The front strip 32, 33 may have the curved portion 31 and outer end loop 38, connected to the rear connection portion 39, which is preferably parallel to the front connector portion of this strip. The attaching strips or composite attaching element of this buffer may comprise the attaching arm 21 bent outward to form a connector portion 22 and inner end loop 23, it being also desirable to form a front connector portion 24 on this strip parallel to the connector portion 22, and adapted to be clamped or connected to the front connector portions of the buffer front element. This may be effected by the front clipping or clamping device 17, while another clamping device 19 may encircle the cooperating rear connector portions of these strips adjacent the end 40. The other attaching strip may comprise the other attaching arm 25 and connected rear connector portion 26, with which may be connected the inner end loop 27 and front connector portion 28. These two connector portions of this strip are preferably substantially parallel and aligned with the cooperating connector portions of the front strip connected thereto as by the clamping devices 18, 20.

In the buffer shown in Figs. 5 and 6, the buffer front element may be formed of two resilient steel strips, one of which may have the end loop 38 and inwardly extending rear connector portion 39 while this strip curves forward in the arched portion 31, which may have one or more upwardly arched or bent contact portions such as 42 preferably adjacent the straight connector end 32 of the strip. The cooperating buffer front strip may have a corresponding connector end 30 and adjacent upwardly arched contact portion 41, which may be intertwined as indicated with the other front strip, so as to bring the straight portions of these strips 30, 43, 44 and 32 substantially into line so that they can be connected in adjusted position by the clamping devices 17, 18. This second buffer front strip has the end loop 35 and adjacent curved portion 39 the strip ending at the point 37 adjacent which a substantially straight rear connector portion 36 is preferably formed substantially parallel to the front connector portions of this strip. The composite inner attaching elements are preferably of similar construction in this case and independently adjustable with respect to the composite front element, so that they can be clamped in any desired adjusted position by the clamping or connecting devices 17, 18, 19 and 20 of any suitable or desired construction.

Figs. 7 and 8 show another desirable form of buffer in which a single looped end buffer front strip or element may comprise the forwardly arched front portion 55, which preferably has a substantially straight connector portion adjacent its central part. This strip may have the end loops 56, 57 merging into the inturned connector portions 58, 59 which adjacent the ends 60 are preferably straight and substantially parallel to the front connector portion of this strip. The attaching strips forming the composite attaching element of this buffer may comprise the spring steel or other strip 45, having the connector portion 46 and inner end loop 47 from which the strip curves inward and forward to the front connector portion 48, which may overlap adjacent its end 49, the corresponding front connector portion of the other attaching strip to which it may be connected adjacent the end 54 as by the enclosing clamping device 61, clamping these two connector portions to the buffer front strip or element. The attaching strip 50 may as indicated have the rear connector portion 51 and end loop 52 merging into its front connector portion 53, the two connector portions of each of these attaching strips being preferably parallel so as to promote the assembling and clamping together of the parts of the buffer, which is very strong and resilient for its weight and has the advantage that these independently adjustable attaching strips which may each be securely clamped at two widely separated points to the buffer front element, so that a very rigid and secure connection is thus made possible.

This invention has been described in connection with, a number of embodiments forms, proportions, parts, arrangements, materials, methods of manufacture, connection and use, to the details of which disclosure the invention is not of course to be limited, since what is claimed as new and what is desired to be secured by Letters Patent is set forth in the appended claims:

1. The resilient strip automobile buffer comprising a one piece spring strip buffer front element having end loops and inturned rear connector portions substantially parallel with the relatively straight front connector portions of the strip, a front reenforcing strip extending across said front connector portion and two attaching strips formed with parallel front and rear connector portions to be adjustably connected to the corresponding connector portions of the buffer front element and formed with end loops adapted to be arranged inside of and closer together than the end loops of said buffer front element.

2. The resilient strip automobile buffer comprising a one piece buffer front element having end loops and inturned rear connector portions substantially parallel with the front connector portions of the strip, and two attaching strips formed with parallel front and rear connector portions to be adjustably connected to the corresponding connector portions of the buffer front element and formed with end loops adapted to be arranged inside the end loops of said buffer front element.

3. The resilient strip automobile buffer comprising a spring strip buffer front element having end loops and inturned rear connector portions and substantially parallel relatively straight front connector portions, attaching strips formed with attaching arms and parallel front and rear connector portions to be independently adjustable with respect to the corresponding connector portions of the buffer front element and formed with end loops adapted to be arranged inside of the end loops of said buffer front element and enclosing clamping devices connecting each of said attaching strips to said buffer front element at two laterally separated points.

4. The resilient strip automobile buffer comprising a spring strip buffer front element having end loops and inturned rear connector portions and front connector portions, attaching strips formed with attaching arms and front and rear connector portions to be independently adjustable with respect to the corresponding connector portions of the buffer front element and formed with end loops and clamping devices connecting each of said attaching strips to said buffer front element at two laterally separated points.

5. The resilient strip automobile buffer comprising a buffer front element having end loops and front and rear connector portions substantially parallel to each other, and two attaching strips formed with loops and with substantially parallel front and rear connector portions to be adjustably connected to the corresponding connector portions of the buffer front element.

6. The resilient strip automobile buffer comprising a buffer front element having end loops and front and rear connector portions, two attaching strips formed with loops and with front and rear connector portions to be adjustably connected to the corresponding connector portions of the buffer front element and clamping devices substantially rigidly connecting the cooperating connector portions.

7. The resilient strip automobile buffer comprising a one piece spring strip buffer front element having end loops and inturned rear connector portions and two attaching strips formed with front and rear connector portions to be adjustably connected at laterally separated points to the corresponding connector portions of the buffer front element and formed with end loops adapted to be independently adjusted inside the end loops of said buffer front element.

8. The automobile buffer comprising a buffer front element having end loops and adjacent rear connector portions and two attaching strips formed with front and rear connector portions to be adjustably connected at laterally separated points to the corresponding connector portions of the buffer front element and formed with end loops adapted to be independently adjusted with respect to the end loops of said buffer front element.

9. The resilient strip automobile buffer comprising a buffer front element having end loops and front and rear connector portions substantially parallel to each other, and two attaching strips formed with loops to be arranged inside of and closer together than said end loops and formed with substantially parallel front and rear connector portions to be adjustably connected to the corresponding connector portions of the buffer front element.

10. The resilient strip automobile buffer comprising a buffer front element having end loops and front and rear connector portions, two attaching strips formed with loops to be arranged inside of and closer together than said end loops and formed with front and rear connector portions to be adjustably connected to the corresponding connector portions of the buffer front element and clamping devices substantially rigidly connecting the cooperating connector portions.

11. The automobile buffer comprising a plurality of spring strip members and formed with end loops adapted to extend out into protective position adjacent the automobile wheels, said members forming inner end loops closer together than and projecting outward to a less extent than the wheel protecting end loops and the front impact portion of said buffer comprising a plurality of vertically separated contact strips adjacent the central part of said front portion.

12. The automobile buffer comprising a plurality of steel strip members and formed with end loops adapted to extend out into protective position adjacent the automobile wheels, said members comprising laterally adjustable attaching arms and connected inner end loops projecting outward to a less extent than the wheel protecting end loops and the front portion of said buffer comprising a plurality of vertically separated contact strips.

13. The automobile buffer comprising a plurality of steel strip members and formed with end loops adapted to extend out into protective position adjacent the automobile wheels, said members comprising laterally adjustable attaching arms and connected inner end loops projecting outward to a less extent than the wheel protecting end loops and the front portion of said buffer comprising a plurality of separated contact strips.

14. The automobile buffer comprising a plurality of steel strip members and formed with end loops adapted to extend out into protective position adjacent the automobile wheels, said members comprising laterally adjustable attaching arms and connected inner end loops projecting outward to a less extent than the wheel protecting end loops.

15. The automobile buffer comprising a plurality of spring steel strip members and formed with rearwardly extending attaching arms adapted to be secured to the automobile and formed with integral end loops adapted to extend out into protective position adjacent the automobile wheels, said members forming inner end loops connected to said attaching arms and arranged closer together than and projecting outward to a less extent than the wheel protecting end loops, and the front impact portion of said buffer comprising a plurality of connected vertically separated contact strips forming an opening having a vertical width greater than the width of said strip members adjacent the central part of said front portion.

16. The automobile buffer formed of vertically wide spring steel strip and comprising rearwardly extending attaching arms adapted to be secured to the automobile and integrally connected outer end loops, and inner members connected to said attaching arms and comprising inner end loops extending outward within said outer end loops and having outer portions considerably out of contact with said outer end loops, the front impact portions of said buffer comprising a plurality of connected front strips integral with the end loops and having oppositely bent vertically separated central contact portions forming an opening at least as wide as the width of the strip adjacent the central part of the buffer front.

17. The automobile buffer formed of vertically wide steel strip and comprising rearwardly extending attaching arms adapted to be secured to the automobile and integrally connected outer end loops, and inner members connected to said attaching arms and comprising inner end loops extending outward within said outer end loops, the front impact portions of said buffer comprising a plurality of connected front strips integral with the end loops and having oppositely bent vertically separated central contact portions forming a considerable vertical opening adjacent the central part of the buffer front.

18. The automobile buffer comprising a plurality of connected steel strip members and formed with rearward attaching arms adapted to be secured to the automobile and formed with outer end loops adapted to extend out into protective position adjacent the automobile wheels, said members forming inner end loops arranged closer together than and projecting outward to a less extent than said outer end loops, and the front impact portion of said buffer comprising a plurality of vertically separated contact strips forming a wide vertical opening adjacent the central part of said front portion.

19. The automobile buffer formed of a plurality of connected vertically wide spring steel strip members and comprising rearward attaching arms adapted to be secured to the automobile and integral outer end loops, and comprising inner resilient loops within said outer end loops, the front impact portions of said buffer comprising a plurality of vertically bent vertically separated central contact portions forming an opening adjacent the central part of the buffer front.

GEORGE ALBERT LYON.